US011676493B2

(12) United States Patent
Xu

(10) Patent No.: US 11,676,493 B2
(45) Date of Patent: Jun. 13, 2023

(54) VEHICLE CONTROL METHOD FOR PLATOONING, VEHICLE MOUNTED APPARATUS AND VEHICLE

(71) Applicant: Beijing Tusen Zhitu Technology Co., Ltd., Beijing (CN)

(72) Inventor: Yong Xu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 245 days.

(21) Appl. No.: 17/133,634

(22) Filed: Dec. 24, 2020

(65) Prior Publication Data

US 2021/0192958 A1 Jun. 24, 2021

(30) Foreign Application Priority Data

Dec. 24, 2019 (CN) .......................... 201911347449.4

(51) Int. Cl.
*G08G 1/00* (2006.01)
*H04W 4/46* (2018.01)
(Continued)

(52) U.S. Cl.
CPC ........... *G08G 1/22* (2013.01); *B60W 60/0027* (2020.02); *G05D 1/0276* (2013.01);
(Continued)

(58) Field of Classification Search
CPC ....... G08G 1/22; H04W 4/46; B60W 60/0027
See application file for complete search history.

(56) References Cited

U.S. PATENT DOCUMENTS 6,032,097 A * 2/2000 Iihoshi ................ G08G 1/22
340/436
2003/0217880 A1 * 11/2003 Isogai .................. B60W 30/16
180/170
(Continued)

FOREIGN PATENT DOCUMENTS

CN 108284836 A 7/2018
CN 109062221 A 12/2018
(Continued)

OTHER PUBLICATIONS

Chinese Patent Office, First Office Action for CN 201911347449.4, dated May 31, 2022, 18 pages with English translation.

(Continued)

*Primary Examiner* — Peter D Nolan
*Assistant Examiner* — Kenneth M Dunne
(74) *Attorney, Agent, or Firm* — Paul Liu; Julie J. Muyco; Perkins Coie, LLP

(57) ABSTRACT

A vehicle control method for platooning vehicles includes determining, for a first following vehicle, a predicted movement state information, and a lead vehicle predicted movement state information of a lead vehicle corresponding to a number of time points in the future. In the vehicle control method, when there is an adjacent second following vehicle, second following vehicle predicted movement state information corresponding to the number of time points is determined, and also includes determining optimized control quantities corresponding to respective ones of the number of time points, including determining an overall constraint model based on constraints between the first following vehicle and the lead vehicle, and constraints between the first following vehicle and the second following vehicle; determining the optimized control quantities; and performing longitudinal control in accordance with the optimized (Continued)

control quantities. A vehicle and an apparatus mounted therein may execute the vehicle control method.

20 Claims, 4 Drawing Sheets

(51) Int. Cl.
  *B60W 60/00* (2020.01)
  *G05D 1/02* (2020.01)
(52) U.S. Cl.
  CPC ............ *G05D 1/0295* (2013.01); *H04W 4/46* (2018.02); *B60W 2520/10* (2013.01); *B60W 2520/105* (2013.01); *B60W 2554/4041* (2020.02); *B60W 2554/4042* (2020.02); *B60W 2554/802* (2020.02); *B60W 2556/45* (2020.02); *B60W 2720/10* (2013.01); *B60W 2720/106* (2013.01); *B60W 2754/30* (2020.02)

(56) References Cited

U.S. PATENT DOCUMENTS

| | | | | |
|---|---|---|---|---|
| 2011/0093177 | A1* | 4/2011 | Horn | B60W 30/16 701/70 |
| 2013/0041576 | A1* | 2/2013 | Switkes | G01C 22/00 701/123 |
| 2018/0190119 | A1* | 7/2018 | Miller, Jr. | B60W 30/165 |
| 2019/0129447 | A1* | 5/2019 | Tulpule | G08G 1/22 |
| 2019/0196501 | A1* | 6/2019 | Lesher | B60T 8/1708 |
| 2019/0299989 | A1* | 10/2019 | Tulpule | B60W 50/0097 |
| 2020/0369273 | A1* | 11/2020 | Wang | B60W 30/146 |
| 2021/0232157 | A1* | 7/2021 | Dieckmann | B60W 30/165 |
| 2022/0203988 | A1* | 6/2022 | Brandin | B60W 30/182 |

FOREIGN PATENT DOCUMENTS

| | | | | |
|---|---|---|---|---|
| CN | 109144076 A | | 1/2019 | |
| CN | 110329257 A | | 10/2019 | |
| DE | 10023067 A1 | * | 11/2001 | ......... B60K 31/0008 |
| JP | 2015080977 A | | 4/2015 | |
| JP | 2019091424 A | * | 6/2019 | ................ G08G 1/22 |
| WO | WO-2009068128 A1 | * | 6/2009 | ......... B60K 31/0008 |
| WO | 2015047177 A1 | | 4/2015 | |
| WO | WO-2021110638 A1 | * | 6/2021 | ........... G05D 1/0293 |

OTHER PUBLICATIONS

European Application No. 20216873.8, Extended European Search Report dated Apr. 29, 2021, pp. 1-9.

English translation of Chinese Office Action from corresponding Chinese Patent Application No. 201911347449.4, dated Oct. 19, 2022 (16 pages).

* cited by examiner

VEHICLE CONTROL METHOD FOR PLATOONING, VEHICLE MOUNTED APPARATUS AND VEHICLE

CROSS-REFERENCE

The present disclosure claims priority to Chinese Patent Application No. 201911347449.4, titled "VEHICLE CONTROL METHOD FOR PLATOONING, VEHICLE MOUNTED APPARATUS AND VEHICLE", filed on Dec. 24, 2019, the content of which is incorporated herein by reference in its entirety.

TECHNICAL FIELD

The present disclosure relates to autonomous driving technology, and more particularly, to a vehicle control method for platooning, a vehicle mounted apparatus, and a vehicle.

BACKGROUND

At present, a collaborative autonomous driving fleet, or platooning, refers to a plurality of vehicles tagging along at an extremely short distance in a platoon with support of autonomous driving technology and Vehicle-to-Vehicle (V2V) communication technology. In such platoon, the distance between vehicles could be only 20 meters or shorter, much shorter than a typical safe driving distance. The extremely short distance allows an airflow cut through by a lead vehicle to be directly accepted by a following vehicle at the rear of the lead vehicle, without forming a low-pressure turbulence zone, thereby effectively reducing the overall air resistance of the entire platoon while moving. Generally, with the resistance reduced by platooning, fuel consumption can be saved.

There may be a plurality of vehicles in a platoon. How to accurately control each vehicle in a longitudinal direction to ensure a stable distance between vehicles and a stable speed of each vehicle has become a focus of attention.

SUMMARY

The embodiments of the present disclosure provide a vehicle control method for platooning, a vehicle mounted apparatus, and a vehicle, capable of controlling vehicles in a platoon smoothly and accurately, thereby avoiding platooning failures due to drastic changes in distances and/or speeds of the vehicles in the platoon.

In order to achieve the above object, the following technical solutions are provided according to the embodiments of the present disclosure.

In a first aspect of the embodiments of the present disclosure, a vehicle control method for platooning is provided. The method is applied in a platoon including a lead vehicle and one or more following vehicles. The one or more following vehicles are arranged in a predefined order behind the lead vehicle. The method includes: obtaining first following vehicle movement state information of a first following vehicle itself in the platoon and lead vehicle movement state information of the lead vehicle in real time, and obtaining, when there is an adjacent second following vehicle in front of the first following vehicle itself, second following vehicle movement state information of the second following vehicle in real time; determining first following vehicle predicted movement state information and lead vehicle predicted movement state information corresponding to a number of time points after a current time point based on the first following vehicle movement state information and the lead vehicle movement state information, respectively, and determining, when there is the adjacent second following vehicle in front of the first following vehicle itself, second following vehicle predicted movement state information corresponding to the number of time points after the current time point based on the second following vehicle movement state information; determining, when there is no adjacent second following vehicle in front of the first following vehicle itself, optimized control quantities corresponding to respective ones of the number of time points based on the first following vehicle predicted movement state information and the lead vehicle predicted movement state information corresponding to the respective ones of the number of time points by means of optimized solution, or determining, when there is the adjacent second following vehicle in front of the first following vehicle itself, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution; and transmitting the optimized control quantities to a longitudinal controller of the first following vehicle itself, such that the longitudinal controller controls a longitudinal actuator of the first following vehicle itself to perform longitudinal control in accordance with the optimized control quantities.

In a second aspect of the embodiments of the present disclosure, a first vehicle mounted apparatus is provided. The first vehicle mounted apparatus is provided in a first following vehicle in a platoon including a lead vehicle and one or more following vehicles. The one or more following vehicles are arranged in a predefined order behind the lead vehicle. The first vehicle mounted apparatus includes: a movement state information obtaining unit configured to obtain first following vehicle movement state information of the first following vehicle itself in the platoon and lead vehicle movement state information of the lead vehicle in real time, and obtain, when there is an adjacent second following vehicle in front of the first following vehicle itself, second following vehicle movement state information of the second following vehicle in real time; a predicted movement state information determining unit configured to determine first following vehicle predicted movement state information and lead vehicle predicted movement state information corresponding to a number of time points after a current time point based on the first following vehicle movement state information and the lead vehicle movement state information, respectively, and determine, when there is the adjacent second following vehicle in front of the first following vehicle itself, second following vehicle predicted movement state information corresponding to the number of time points after the current time point based on the second following vehicle movement state information; an optimized control quantity determining unit configured to determine, when there is no adjacent second following vehicle in front of the first following vehicle itself, optimized control quantities corresponding to respective ones of the number of time points based on the first following vehicle predicted movement state information and the lead vehicle predicted movement state information corresponding to the respective ones of the number of time points by means of optimized solution, or determine, when there is the adjacent second following vehicle in front of the first following vehicle itself, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution; and an optimized control quantity transmitting unit configured to transmit the optimized control quantities to a longitudinal controller of the first following vehicle itself, such that the longitudinal controller controls a longitudinal actuator of the first following vehicle itself to perform longitudinal control in accordance with the optimized control quantities.

In a third aspect of the embodiments of the present disclosure, an autonomous vehicle is provided. The autonomous vehicle operates in a platoon as a first following vehicle in the platoon. The platoon includes a lead vehicle and one or more following vehicles. The one or more following vehicles are arranged in a predefined order behind the lead vehicle. The autonomous vehicle includes a first vehicle mounted apparatus, a longitudinal controller, and a longitudinal actuator. The first vehicle mounted apparatus is connected to the longitudinal controller, and the longitudinal controller is connected to the longitudinal actuator. The first vehicle mounted apparatus is configured to: obtain first following vehicle movement state information of a first following vehicle itself in the platoon and lead vehicle movement state information of the lead vehicle in real time, and obtain, when there is an adjacent second following vehicle in front of the first following vehicle itself, second following vehicle movement state information of the second following vehicle in real time; determine first following vehicle predicted movement state information and lead vehicle predicted movement state information corresponding to a number of time points after a current time point based on the first following vehicle movement state information and the lead vehicle movement state information, respectively, and determine, when there is the adjacent second following vehicle in front of the first following vehicle itself, second following vehicle predicted movement state information corresponding to the number of time points after the current time point based on the second following vehicle movement state information; determine, when there is no adjacent second following vehicle in front of the first following vehicle itself, optimized control quantities corresponding to respective ones of the number of time points based on the first following vehicle predicted movement state information and the lead vehicle predicted movement state information corresponding to the respective ones of the number of time points by means of optimized solution, or determine, when there is the adjacent second following vehicle in front of the first following vehicle itself, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution; and transmit the optimized control quantities to the longitudinal controller of the first following vehicle itself. The longitudinal controller is configured to control the longitudinal actuator of the first following vehicle itself to perform longitudinal control in accordance with the optimized control quantities.

In a fourth aspect of the present disclosure, a computer readable storage medium is provided. The computer readable storage medium includes a program or instructions which, when executed on a computer, cause the computer to perform the vehicle control method for platooning according to the above first aspect.

In a fifth aspect of the present disclosure, a computer program product is provided. The computer program product includes instructions. The computer program product, when executed on a computer, causes the computer to perform the vehicle control method for platooning according to the above first aspect.

In a sixth aspect of the present disclosure, a chip system is provided. The chip system includes a processor. The processor is coupled to a memory storing program instructions which, when executed by the processor, cause the processor to perform the vehicle control method for platooning according to the above first aspect.

In a seventh aspect of the present disclosure, a circuit system is provided. The circuit system includes a processing circuit configured to perform the vehicle control method for platooning according to the above first aspect.

In an eighth aspect of the present disclosure, a computer server is provided. The computer server includes a memory and one or more processors communicatively connected to the memory. The memory stores instructions executable by the one or more processors. The instructions, when executed by the one or more processors, cause the one or more processors to perform the vehicle control method for platooning according to the above first aspect.

The present disclosure provides a vehicle control method for platooning, a vehicle mounted apparatus, and a vehicle. First, first following vehicle movement state information and lead vehicle movement state information can be obtained in real time. When there is an adjacent second following vehicle in front of the first following vehicle, second following vehicle movement state information can be obtained in real time. Then, first following vehicle predicted movement state information and lead vehicle predicted movement state information corresponding to a number of time points in the future can be determined. When there is the adjacent second following vehicle in front of the first following vehicle, second following vehicle predicted movement state information corresponding to the number of time points in the future can be determined. Then, optimized control quantities corresponding to respective ones of the number of time points can be determined by means of optimized solution, and longitudinal control can be performed in accordance with the optimized control quantities. It can be seen that the present disclosure can comprehensively consider the relationship between the following vehicle and the lead vehicle, as well as the relationship between the following vehicle and its preceding vehicle, and then obtain the optimized control quantities for the following vehicle, such that vehicles in a platoon can be controlled smoothly and accurately, thereby avoiding platooning failures due to drastic changes in distances and/or speeds of the vehicles in the platoon.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

Figure 1:
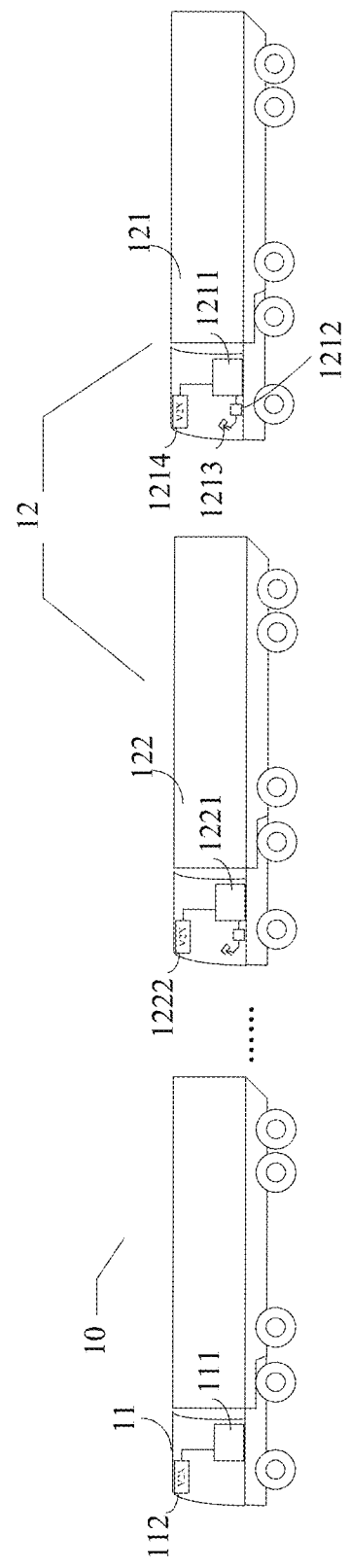
FIG. 1 is a schematic diagram of platooning according to an embodiment of the present disclosure.

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

It is to be noted that the terms "first" and "second" in the description and claims of the present disclosure and the above-mentioned figures are used to distinguish similar objects from each other, and are not necessarily used to describe a specific sequence or order. It should be understood that the data used in this way can be interchanged as appropriate for the purpose of illustration of the embodiments of the present disclosure. In addition, the terms "comprising" and "having" and any variants thereof are intended to cover non-exclusive inclusions. For example, a process, method, system, product or device that includes a series of steps or units is not necessarily limited to those steps or units that are explicitly listed, and may include other steps or units that are not explicitly listed or are inherent to the process, method, product, or device.

In order to allow those skilled in the art to better understand the present disclosure, some of the technical terms used in the embodiments of the present disclosure are explained as follows:

V2V: Vehicle-to-Vehicle, V2V communication technology is a communication technology for providing direct end-to-end wireless communications for moving vehicles, without being constrained to fixed base stations.

V2X: Vehicle-to-X, is a key technology of the future intelligent transportation system. It enables communications between vehicles, vehicles and base stations, and base stations and base stations, so as to obtain a series of traffic information, such as real-time road conditions, road information, and pedestrian information, thereby improving driving safety, reducing congestion, improving traffic efficiency, and providing in-vehicle entertainment information.

GNSS: Global Navigation Satellite System.

GPS: Global Positioning System.

In some embodiments of the present disclosure, the term "vehicle" is to be broadly interpreted in the present disclosure as including any moving objects, including for example aircraft, ships, spacecrafts, cars, trucks, vans, semi-trailers, motorcycles, golf carts, off-road vehicles, warehouse transport vehicles, agricultural vehicles, and vehicles running on tracks, such as trams or trains and other rail vehicles. A "vehicle" as used in the present disclosure may typically include: a power system, a sensor system, a control system, peripheral devices and a computer system. In other embodiments, a vehicle may include more, fewer, or different systems.

Here, the power system is a system that supplies power to the vehicle, including: an engine/motor, a transmission, wheels/tyres, and a power source unit.

The control system may include a combination of devices that control the vehicle and its components, such as a steering unit, a throttle, and a brake unit.

The peripheral devices may be devices that allow the vehicle to interact with external sensors, other vehicles, external computing devices, and/or users, including e.g., a wireless communication system, a touch screen, a microphone, and/or a speaker.

Based on the vehicle described above, an autonomous vehicle can be further provided with a sensor system and an autonomous control device.

The sensor system may include a plurality of sensors for sensing information on an environment in which the vehicle is located, and one or more actuators that change respective positions and/or directions of the sensors. The sensor system may include any combination of sensors such as a Global Positioning System (GPS) sensor, an Inertial Measurement Unit (IMU), a Radio Detection and Ranging (RADAR) unit, a camera, a laser rangefinder, a Light Detection and Ranging (LIDAR) unit, and/or an acoustic sensor. The sensor system may further include sensors that monitor the vehicle's internal systems (such as an $O_2$ monitor, a fuel gauge, an engine thermometer, etc.).

The autonomous control device may include a processor and a memory having at least one machine executable instruction stored therein. The processor executes the at least one machine executable instruction to provide functions including e.g., a map engine, a positioning module, a perception module, a navigation or route module, and an autonomous control module. The map engine and the positioning module are configured to provide map information and positioning information. The perception module is configured to perceive objects in the environment around the vehicle based on information obtained by the sensor system and the map information provided by the map engine. The navigation or route module is configured to plan a driving route for the vehicle based on processing results from the map engine, the positioning module and the perception module. The autonomous control module is configured to convert decision information inputted from the modules such as the navigation or route module into a control command for outputting to a vehicle control system, and transmit the control command to respective components in the vehicle control system over an in-vehicle network (for example, an in-vehicle electronic network system implemented using a CAN bus, a local interconnection network, a multimedia directional system transmission, etc.) for autonomous control of the vehicle. The autonomous control module can also obtain information on respective components in the vehicle via the in-vehicle network.

At present, a platoon may include two or more vehicles. The first vehicle in the platoon is referred to as lead vehicle, and the vehicles following the lead vehicle are referred to as following vehicles. Since there may be many vehicles in the platoon, it is necessary to consider control of distances, speeds, acceleration, etc. of the vehicles in the platoon.

Currently, there are typically the following two schemes for controlling vehicles in a platoon.

Scheme 1

Based on a state of a current following vehicle and a state of its preceding vehicle, such as speeds of the two vehicles, a distance between the two vehicles, the acceleration of the two vehicles, etc., a correspondence can be created to determine a longitudinal control strategy in time. For example, if the current distance between the two vehicles is 50 meters, and the target vehicle distance required for platooning is 20 meters, it can be determined that the following vehicle should accelerate. As another example, if the speed of the current following vehicle is 5 m/s, and the speed of the preceding vehicle is 4 m/s, it can be determined that the current following vehicle should decelerate. This scheme is advantageous in that it enables a fast tracking of the preceding vehicle, but disadvantage in that there will be frequent acceleration and deceleration. For example, when the current distance between the two vehicles is 20.5 meters, and the target vehicle distance is 20 meters, the current following vehicle should accelerate at this time. When the distance between the two vehicles is reduced to 19.9 meters at the next moment, and the target vehicle distance is 20 meters, the current following vehicle needs to decelerate immediately at this time. It can be seen that the control method of Scheme 1 is not conducive to fuel saving of the vehicle, and the passenger experience of the vehicle is also poor as the vehicle is frequently accelerated and decelerated.

Scheme 2

A kinematic model can be created, and kinematic parameters of a current following vehicle and its preceding vehicles can be obtained. Better longitudinal control quantities for a period of time in the future can be optimized by means of model prediction, so as to balance fuel saving and passenger experience.

A common problem of the above two schemes is that existing sensors on autonomous vehicles do not have high detection accuracy for distances, speeds, and acceleration, and have a high time delay. Several hundred milliseconds are typically required for the latest kinematic parameters of the preceding vehicle to be accurately obtained by the following vehicle. The movement changes made by the preceding vehicle during this period cannot be accurately obtained by the following vehicle in time. Therefore, in case of high-speed movement, if a distance of tens of meters between vehicles is to be maintained stably, neither the above two schemes is feasible.

Especially when platooning is applied in a platoon of trucks (which are typically heavy), a following vehicle must always follow its preceding vehicle. For example, after the movement of the lead vehicle changes, it takes a certain amount of time for the first following vehicle to track the new state, and the second following vehicle can only track the new state of the first following vehicle a certain amount of time after the first following vehicle's tracking of lead vehicle becomes stable. In this way, once the movement of the lead vehicle changes, each of the following vehicles needs to sequentially track its preceding vehicle stably. Therefore, it is difficult to maintain a formation of the platoon, which may eventually cause the entire platoon to be highly unstable. As a result, there may be drastic changes in the movement of the last vehicle in the platoon (which may need sudden acceleration and sudden deceleration), which may finally lead to failure of the entire platoon.

In order to overcome the above-mentioned problems, according to an embodiment of the present disclosure, a vehicle control method for platooning is provided. The method is applied to a platoon 10 as shown in FIG. 1. The platoon 10 includes a lead vehicle 11 and one or more following vehicles 12. The one or more following vehicles 12 are arranged in a predefined order behind the lead vehicle 11. For example, one of the following vehicles 12 is referred to here as a first following vehicle 121, and the above-mentioned vehicle control method for platooning will be described with reference to control of the first following vehicle 121 itself. In addition, if the first following vehicle 121 is not the vehicle immediately following the lead vehicle 11, there is a following vehicle, referred to here as a second following vehicle 122, in front of the first following vehicle 121. In an embodiment of the present disclosure, as shown in FIG. 1, the lead vehicle 11 may be provided with a lead vehicle mounted apparatus 111 and a lead vehicle V2X communication device 112. The first following vehicle 121 may be provided with a first vehicle mounted apparatus 1211, a longitudinal controller 1212, a longitudinal actuator 1213, and a first V2X communication device 1214. The first vehicle mounted apparatus 1211 is connected to the longitudinal controller 1212 and the first V2X communication device 1214, respectively. The longitudinal controller 1212 is connected to, and configured to control, the longitudinal actuator 1213. The second following vehicle 122 may be provided with a second vehicle mounted apparatus 1221 and a second V2X communication device 1222. The second vehicle mounted apparatus 1221 is connected to the second V2X communication device 1222 (in addition, the structure of the second following vehicle 122 can be similar to that of the first following vehicle 121, and can be provided with a longitudinal controller and a longitudinal actuator as well, details of which will be omitted here). The lead vehicle V2X communication device 112, the first V2X communication device 1214, and the second V2X communication device 1222 may be connected with each other via V2V communication, respectively.

Here, in an embodiment of the present disclosure, the lead vehicle mounted apparatus 111, the first vehicle mounted apparatus 1211, and the second vehicle mounted apparatus 1221 may be a vehicle mounted computer or a vehicle mounted server having computational processing capabilities.

Here, in an embodiment of the present disclosure, the longitudinal controller 1212 may be a throttle controller or a brake pedal controller of the vehicle. Correspondingly, in an embodiment of the present disclosure, the longitudinal actuator 1213 may be a throttle pedal or a brake pedal of the vehicle.

Here, in an embodiment of the present disclosure, each vehicle in the platoon may also be provided with various positioning sensors (not shown), such as integrated navigation system devices or vehicle mounted GNSS devices, e.g., vehicle mounted GPS devices or vehicle mounted Beidou satellite navigation system devices. In addition, various positioning sensors may also include sensors such as cameras and laser radars for perceiving an external environment of the vehicle and assisting the vehicle mounted GNSS devices in positioning. Details of specific vehicle positioning schemes will be omitted here.

Figure 2:
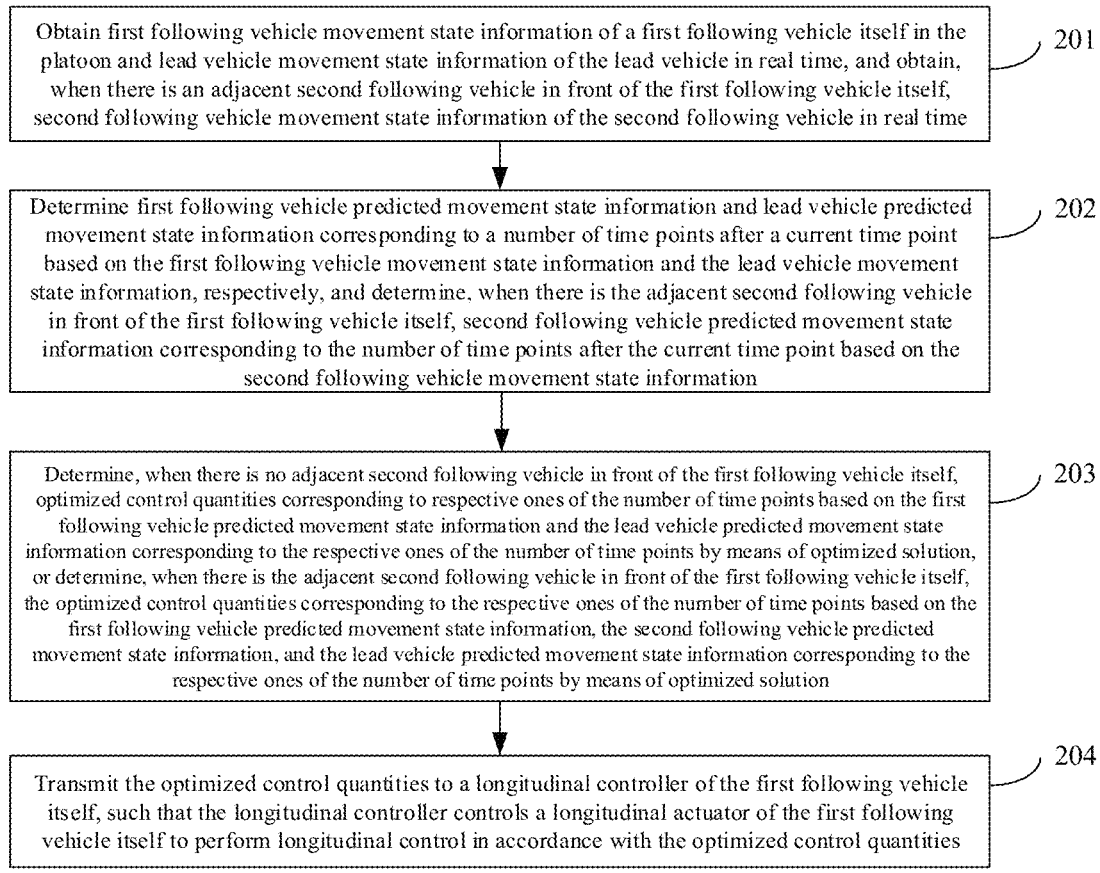
FIG. 2 is a first flowchart illustrating a vehicle control method for platooning according to an embodiment of the present disclosure.

As shown in FIG. 2, according to an embodiment of the present disclosure, a vehicle control method for platooning is provided. The method includes the following steps.

At step 201, first following vehicle movement state information of a first following vehicle itself in the platoon and lead vehicle movement state information of the lead vehicle are obtained in real time, and when there is an adjacent second following vehicle in front of the first following vehicle itself, second following vehicle movement state information of the second following vehicle is obtained in real time.

At step 202, first following vehicle predicted movement state information and lead vehicle predicted movement state information corresponding to a number of time points after a current time point are determined based on the first following vehicle movement state information and the lead vehicle movement state information, respectively, and when there is the adjacent second following vehicle in front of the first following vehicle itself, second following vehicle predicted movement state information corresponding to the number of time points after the current time point is determined based on the second following vehicle movement state information.

At step 203, when there is no adjacent second following vehicle in front of the first following vehicle itself, optimized control quantities corresponding to respective ones of the number of time points are determined based on the first following vehicle predicted movement state information and the lead vehicle predicted movement state information corresponding to the respective ones of the number of time points by means of optimized solution, or when there is the adjacent second following vehicle in front of the first following vehicle itself, the optimized control quantities corresponding to the respective ones of the number of time points are determined based on the first following vehicle predicted movement state information, the second following vehicle predicted movement state information, and the lead vehicle predicted movement state information corresponding to the respective ones of the number of time points by means of optimized solution.

At step 204, the optimized control quantities are transmitted to a longitudinal controller of the first following vehicle itself, such that the longitudinal controller controls a longitudinal actuator of the first following vehicle itself to perform longitudinal control in accordance with the optimized control quantities.

It is to be noted that, in general, there may be two types of longitudinal control of a vehicle in a platoon, one is vehicle acceleration control, i.e., throttle control, and the other is vehicle deceleration control, i.e., brake control.

Figure 3:
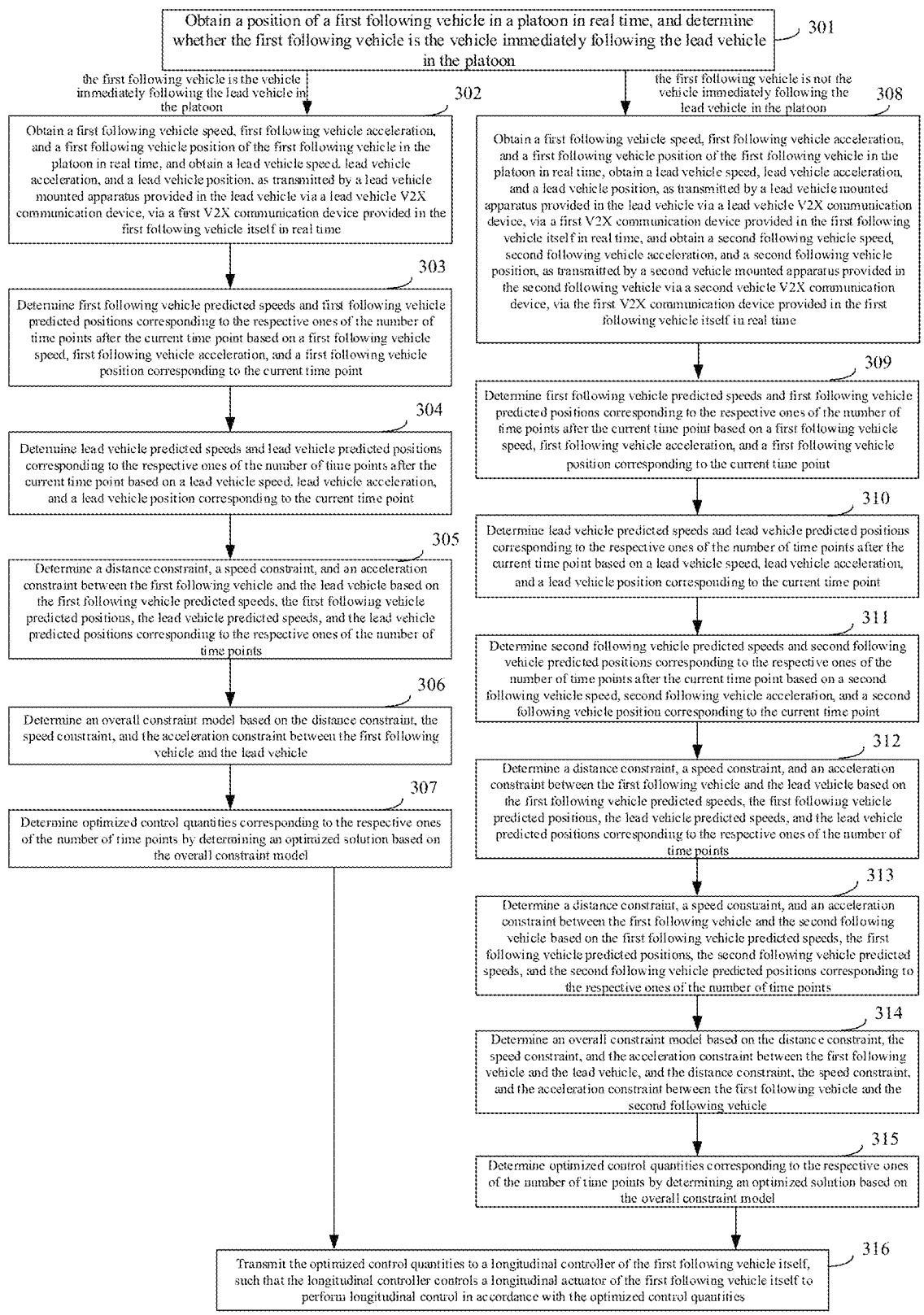
FIG. 3 is a second flowchart illustrating a vehicle control method for platooning according to an embodiment of the present disclosure.

In order to facilitate better understanding of the present disclosure by those skilled in the art, a more detailed embodiment will be given below. As shown in FIG. 3, according to an embodiment of the present disclosure, a vehicle control method for platooning is provided. The method includes the following steps.

At step 301, a position of a first following vehicle in a platoon is obtained in real time, and it is determined whether the first following vehicle is the vehicle immediately following the lead vehicle in the platoon.

Here, the position of the first following vehicle itself in the platoon may refer to the sequence number of the first following vehicle in the platoon. For example, after the platoon is formed, the lead vehicle (e.g., the lead vehicle mounted apparatus) can record the sequence in which the following vehicles join the platoon, and subsequently the first following vehicle can obtain its own position in the platoon from the lead vehicle by means of V2X communication.

When the first following vehicle is the vehicle immediately following the lead vehicle in the platoon, the method proceeds with step 302 to step 307. When the first following vehicle is not the vehicle immediately following the lead vehicle in the platoon (i.e., it can be determined that there is an adjacent second following vehicle in front of the first following vehicle itself), the method proceeds with step 308 to step 315.

At step 302, a first following vehicle speed, first following vehicle acceleration, and a first following vehicle position of the first following vehicle in the platoon are obtained in real time, and a lead vehicle speed, lead vehicle acceleration, and a lead vehicle position, as transmitted by a lead vehicle mounted apparatus provided in the lead vehicle via a lead vehicle V2X communication device, are obtained via a first V2X communication device provided in the first following vehicle itself in real time.

For example, the first following vehicle position and the lead vehicle position can be obtained by using devices such as GPS devices or integrated navigation system devices, and details thereof will be omitted here.

At step 303, first following vehicle predicted speeds and first following vehicle predicted positions corresponding to the respective ones of the number of time points after the current time point are determined based on a first following vehicle speed, first following vehicle acceleration, and a first following vehicle position corresponding to the current time point.

Here, the step 303 can be implemented as follows. For example, the first following vehicle predicted speed $V_{n(k)}$ and the first following vehicle predicted position $P_{n(k)}$ corresponding to the k-th time point $t_{(k)}$ can be determined based on the first following vehicle speed $V_{n(0)}$, the first following vehicle acceleration $A_{n(0)}$, and the first following vehicle position $P_{n(0)}$ corresponding to the current time point $t_{(0)}$ according to:

$$V_{n(k)} = V_{n(k-1)} + A_{n(k-1)} \cdot (t_{(k)} - t_{(k-1)}), \text{ and}$$

$$P_{n(k)} = P_{n(k-1)} + V_{n(k-1)} \cdot (t_{(k)} - t_{(k-1)}) + \frac{1}{2} A_{n(k-1)} \cdot (t_{(k)} - t_{(k-1)})^2,$$

where n represents the n-th following vehicle in the platoon, $V_{n(k-1)}$ is the first following vehicle predicted speed at the (k−1)-th time point $t_{(k-1)}$, $A_{n(k-1)}$ is the first following vehicle acceleration at the (k−1)-th time point $t_{(k-1)}$, and $P_{n(k-1)}$ is the first following vehicle predicted position at the (k−1)-th time point $t_{(k-1)}$. Here, $A_{n(k-1)}$ can be the first following vehicle acceleration $A_{n(0)}$ at the current time point $t_{(0)}$, and subsequently (e.g., at time point $t_{(1)}$ and subsequent time points), can be the first following vehicle predicted acceleration to be solved.

At step 304, lead vehicle predicted speeds and lead vehicle predicted positions corresponding to the respective ones of the number of time points after the current time point are determined based on a lead vehicle speed, lead vehicle acceleration, and a lead vehicle position corresponding to the current time point.

Here, the step 304 can be implemented as follows. For example, the lead vehicle predicted speed $V_{0(k)}$ and the lead vehicle predicted position $P_{0(k)}$ corresponding to the k-th time point $t_{(k)}$ can be determined based on the lead vehicle speed $V_{0(0)}$, the lead vehicle acceleration $A_{0(0)}$, and the lead vehicle position $P_{0(0)}$ corresponding to the current time point $t_{(0)}$ according to:

$$V_{0(k)} = V_{0(k-1)} + A_{0(k-1)} \cdot (t_{(k)} - t_{(k-1)}), \text{ and}$$

$$P_{0(k)} = P_{0(k-1)} + V_{0(k-1)} \cdot (t_{(k)} - t_{(k-1)}) + \frac{1}{2} A_{0(k-1)} \cdot (t_{(k)} - t_{(k-1)})^2,$$

where $V_{0(k-1)}$ is the lead vehicle predicted speed at the (k−1)-th time point $t_{(k-1)}$, $A_{0(k-1)}$ is the lead vehicle acceleration at the (k−1)-th time point $t_{(k-1)}$, and $P_{0(k-1)}$ is the lead vehicle predicted position at the (k−1)-th time point $t_{(k-1)}$. Here, $A_{0(k-1)}$ can be the lead vehicle acceleration $A_{0(0)}$ at the current time point $t_{(0)}$, and subsequently (e.g., at time point $t_{(1)}$ and subsequent time points), can be the lead vehicle predicted acceleration to be solved.

At step 305, a distance constraint, a speed constraint, and an acceleration constraint between the first following vehicle and the lead vehicle are determined based on the first following vehicle predicted speeds, the first following vehicle predicted positions, the lead vehicle predicted speeds, and the lead vehicle predicted positions corresponding to the respective ones of the number of time points.

Here, the distance constraint, the speed constraint, and the acceleration constraint between the first following vehicle and the lead vehicle can be respectively:

$$DD_{(0)} = \text{abs}(P_{1(k)} - P_{0(k)} - \text{dis}),$$

$$DV_{(0)} = \text{abs}(V_{1(k)} - V_{0(k)}), \text{ and}$$

$$DA_{(0)} = \text{abs}(A_{1(k)} - A_{0(k)}),$$

where $DD_{(0)}$ is the distance constraint between the first following vehicle and the lead vehicle, $DV_{(0)}$ is the speed constraint between the first following vehicle and the lead vehicle, $DA_{(0)}$ is the acceleration constraint between the first following vehicle and the lead vehicle, abs represents an absolute value function, dis represents a predefined target tracking distance, $P_{1(k)}$ is the first following vehicle predicted position at the k-th time point $t_{(k)}$, $P_{0(k)}$ is the lead vehicle predicted position at the k-th time point $t_{(k)}$, $V_{1(k)}$ is the first following vehicle predicted speed at the k-th time point $t_{(k)}$, $V_{0(k)}$ is the lead vehicle predicted speed at the k-th time point $t_{(k)}$, $A_{1(k)}$ is the first following vehicle acceleration at the k-th time point $t_{(k)}$, and $A_{0(k)}$ is the lead vehicle acceleration at the k-th time point $t_{(k)}$.

At step 306, an overall constraint model is determined based on the distance constraint, the speed constraint, and the acceleration constraint between the first following vehicle and the lead vehicle.

Here, the overall constraint model can be:

$$D_1 = a_1 DD_{(0)} + a_2 DV_{(0)} + a_3 DA_{(0)},$$

where $a_1$, $a_2$, and $a_3$ are predefined weight coefficients. Here, $a_1$, $a_2$, and $a_3$ can be predefined according to actual requirements. For example, when the overall vehicle distance of the platoon converges slowly over time, i.e., when the target tracking distance is reached slowly, $a_1$ can be increased. When the speeds of all vehicles in the platoon converge slowly, as needs to be increased. When the acceleration and deceleration in the platoon are not synchronized, and the acceleration and deceleration of the following vehicles are frequently switched as a result, $a_3$ needs to be increased. In addition, it is to be noted that, among the predefined weight coefficients, increasing some of the weights is equivalent to decreasing other weights. The values of the predefined weight coefficients can be adjusted according to the overall test performance of the platoon, which is in particular dependent on the power and braking performance of each vehicle and its preceding vehicle in the platoon, and details thereof will be omitted here.

At step 307, optimized control quantities corresponding to the respective ones of the number of time points are determined by determining an optimized solution based on the overall constraint model.

Here, the step 307 can be implemented as follows. The optimized solution can be determined based on the overall constraint model of $D_1 = a_1 DD_{(0)} + a_2 DV_{(0)} + a_3 DA_{(0)}$, to determine, as the optimized control quantity, the first following vehicle acceleration $A_{1(k)}$ at the k-th time point $t_{(k)}$ when $D_1$ is minimized.

The method proceeds with step 316 after step 307.

At step 308, a first following vehicle speed, first following vehicle acceleration, and a first following vehicle position of the first following vehicle in the platoon are obtained in real time, a lead vehicle speed, lead vehicle acceleration, and a lead vehicle position, as transmitted by a lead vehicle mounted apparatus provided in the lead vehicle via a lead vehicle V2X communication device, are obtained via a first V2X communication device provided in the first following vehicle itself in real time, and a second following vehicle speed, second following vehicle acceleration, and a second following vehicle position, as transmitted by a second vehicle mounted apparatus provided in the second following vehicle via a second vehicle V2X communication device, are obtained via the first V2X communication device provided in the first following vehicle itself in real time.

For example, the first following vehicle position, the second following vehicle position, and the lead vehicle position can be obtained by using devices such as GPS devices or integrated navigation system devices, and details thereof will be omitted here.

At step 309, first following vehicle predicted speeds and first following vehicle predicted positions corresponding to the respective ones of the number of time points after the current time point are determined based on a first following vehicle speed, first following vehicle acceleration, and a first following vehicle position corresponding to the current time point.

For the specific implementation of the step 309, reference can be made to the specific implementation of the above step 303, and details thereof will be omitted here.

At step 310, lead vehicle predicted speeds and lead vehicle predicted positions corresponding to the respective ones of the number of time points after the current time point are determined based on a lead vehicle speed, lead vehicle acceleration, and a lead vehicle position corresponding to the current time point.

For the specific implementation of the step 310, reference can be made to the specific implementation of the above step 304, and details thereof will be omitted here.

At step 311, second following vehicle predicted speeds and second following vehicle predicted positions corresponding to the respective ones of the number of time points after the current time point are determined based on a second following vehicle speed, second following vehicle acceleration, and a second following vehicle position corresponding to the current time point.

Here, the step 311 can be implemented as follows. For example, the second following vehicle predicted speed $V_{(n-1)(k)}$ and the second following vehicle predicted position $P_{(n-1)(k)}$ corresponding to the k-th time point $t_{(k)}$ can be determined based on the second following vehicle speed $V_{(n-1)(0)}$, the second following vehicle acceleration $A_{(n-1)(0)}$, and the second following vehicle position $P_{(n-1)(0)}$ corresponding to the current time point $t_{(0)}$ according to:

$$V_{(n-1)(k)} = V_{(n-1)(k-1)} + A_{(n-1)(k-1)} \cdot (t_{(k)} - t_{(k-1)}), \text{ and}$$

$$P_{(n-1)(k)} = P_{(n-1)(k-1)} + V_{(n-1)(k-1)} \cdot (t_{(k)} - t_{(k-1)}) + \frac{1}{2} A_{(n-1)(k-1)} \cdot (t_{(k)} - t_{(k-1)})^2,$$

where n−1 represents the (n−1)-th following vehicle in the platoon, $V_{(n-1)(k-1)}$ is the second following vehicle predicted speed at the (k−1)-th time point $t_{(k-1)}$, $A_{(n-1)(k-1)}$ is the second following vehicle acceleration at the (k−1)-th time point $t_{(k-1)}$, and $P_{(n-1)(k-1)}$ is the second following vehicle predicted position at the (k−1)-th time point $t_{(k-1)}$. Here, $A_{(n-1)(k-1)}$ can be the second following vehicle acceleration $A_{(n-1)(0)}$ at the current time point $t_{(0)}$, and subsequently (e.g., at time point $t_{(1)}$ and subsequent time points), can be the second following vehicle predicted acceleration to be solved.

At step 312, a distance constraint, a speed constraint, and an acceleration constraint between the first following vehicle and the lead vehicle are determined based on the first following vehicle predicted speeds, the first following vehicle predicted positions, the lead vehicle predicted speeds, and the lead vehicle predicted positions corresponding to the respective ones of the number of time points.

Here, the distance constraint, the speed constraint, and the acceleration constraint between the first following vehicle and the lead vehicle can be respectively:

$$DD_{(0)} = \sum_{1}^{n} \text{abs}(P_{n(k)} - P_{0(k)} - n \cdot dis),$$

$$DV_{(0)} = \sum_{1}^{n} \text{abs}(V_{n(k)} - V_{0(k)}), \text{ and}$$

$$DA_{(0)} = \sum_{1}^{n} \text{abs}(A_{n(k)} - A_{0(k)}),$$

where $DD_{(0)}$ is the distance constraint between the first following vehicle and the lead vehicle, $DV_{(0)}$ is the speed constraint between the first following vehicle and the lead vehicle, $DA_{(0)}$ is the acceleration constraint between the first following vehicle and the lead vehicle, abs represents an absolute value function, dis represents a predefined target tracking distance, $P_{n(k)}$ is the first following vehicle predicted position at the k-th time point $t_{(k)}$, $P_{0(k)}$ is the lead vehicle predicted position at the k-th time point $t_{(k)}$; $V_{n(k)}$ is the first following vehicle predicted speed at the k-th time point $t_{(k)}$, $V_{0(k)}$ is the lead vehicle predicted speed at the k-th time point $t_{(k)}$, $A_{n(k)}$ is the first following vehicle acceleration at the k-th time point $t_{(k)}$, $A_{0(k)}$ is the lead vehicle acceleration at the k-th time point $t_{(k)}$, and n indicates that the first following vehicle is the n-th following vehicle in the platoon.

At step 313, a distance constraint, a speed constraint, and an acceleration constraint between the first following vehicle and the second following vehicle are determined based on the first following vehicle predicted speeds, the first following vehicle predicted positions, the second following vehicle predicted speeds, and the second following vehicle predicted positions corresponding to the respective ones of the number of time points.

Here, the distance constraint, the speed constraint, and the acceleration constraint between the first following vehicle and the second following vehicle can be respectively:

$$DD_{(n-1)} = \sum_{2}^{n} \text{abs}(P_{n(k)} - P_{(n-1)(k)} - dis),$$

$$DV_{(n-1)} = \sum_{2}^{n} \text{abs}(V_{n(k)} - V_{(n-1)(k)}), \text{ and}$$

$$DA_{(n-1)} = \sum_{2}^{n} \text{abs}(A_{n(k)} - A_{n-1)(k)}),$$

where $DD_{(n-1)}$ is the distance constraint between the first following vehicle and the second following vehicle, $DV_{(n-1)}$ is the speed constraint between the first following vehicle and the second following vehicle, $DA_{(n-1)}$ is the acceleration constraint between the first following vehicle and the second following vehicle, $P_{(n-1)(k)}$ is the second following vehicle predicted position at the k-th time point $t_{(k)}$, $V_{(n-1)(k)}$ is the second following vehicle predicted speed at the k-th time point $t_{(k)}$, $A_{(n-1)(k)}$ is the second following vehicle acceleration at the k-th time point $t_{(k)}$, n indicates that the first following vehicle is the n-th following vehicle in the platoon, and n−1 indicates that the second following vehicle is the (n−1)-th following vehicle in the platoon.

At step 314, an overall constraint model is determined based on the distance constraint, the speed constraint, and the acceleration constraint between the first following vehicle and the lead vehicle, and the distance constraint, the speed constraint, and the acceleration constraint between the first following vehicle and the second following vehicle.

Here, the overall constraint model can be:
$D_2 = b_1 DD_{(n-1)} + b_2 DD_{(0)} + b_3 DV_{(n-1)} + b_4 DV_{(0)} + b_5 DA_{(n-1)} + b_6 DA_{(0)}$, where $b_1$, $b_2$, $b_3$, $b_4$, $b_5$, and $b_6$ are predefined weight coefficients. Here, $b_1$, $b_2$, $b_3$, $b_4$, $b_5$, and $b_6$ can be predefined according to actual requirements. For example, when the overall vehicle distance of the platoon converges slowly over time, i.e., when the target tracking distance is reached slowly, $b_1$ and $b_2$ can be increased. When the speeds of all vehicles in the platoon converge slowly, $b_3$ and $b_4$ need to be increased. When the acceleration and deceleration in the platoon are not synchronized, and the acceleration and deceleration of the following vehicles are frequently switched as a result, $b_5$ and $b_6$ need to be increased. In addition, it is to be noted that, among the predefined weight coefficients, increasing some of the weights is equivalent to decreasing other weights. The values of the predefined weight coefficients can be adjusted according to the overall test performance of the platoon, which is in particular dependent on the power and braking performance of each vehicle and its preceding vehicle in the platoon, and details thereof will be omitted here.

At step 315, optimized control quantities corresponding to the respective ones of the number of time points can be determined by determining an optimized solution based on the overall constraint model.

Here, the step 315 can be implemented as follows. For example, the optimized solution can be determined based on the overall constraint model of $D_2 = b_1 DD_{(n-1)} + b_2 DD_{(0)} + b_3 DV_{(n-1)} + b_4 DV_{(0)} + b_5 DA_{(n-1)} + b_6 DA_{(0)}$, to determine, as the optimized control quantity, the first following vehicle acceleration $A_{n(k)}$ at the k-th time point $t_{(k)}$ when $D_2$ is minimized.

The method proceeds with step 316 after step 315.

At step 316, the optimized control quantities are transmitted to a longitudinal controller of the first following vehicle itself, such that the longitudinal controller controls a longitudinal actuator of the first following vehicle itself to perform longitudinal control in accordance with the optimized control quantities.

Figure 4:
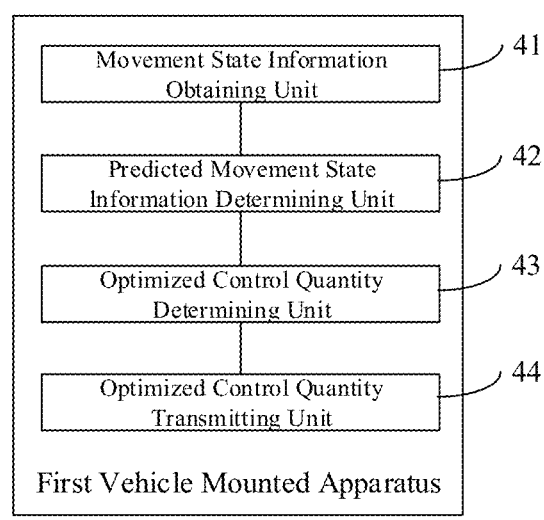
FIG. 4 is a schematic diagram showing a structure of a first vehicle mounted apparatus according to an embodiment of the present disclosure.

As shown in FIG. 4, according to an embodiment of the present disclosure, a first vehicle mounted apparatus is also provided. The first vehicle mounted apparatus is provided in a first following vehicle in a platoon including a lead vehicle and one or more following vehicles. The one or more following vehicles are arranged in a predefined order behind the lead vehicle. The first vehicle mounted apparatus includes:

a movement state information obtaining unit 41 configured to obtain first following vehicle movement state information of the first following vehicle itself in the platoon and lead vehicle movement state information of the lead vehicle in real time, and obtain, when there is an adjacent second following vehicle in front of the first following vehicle itself, second following vehicle movement state information of the second following vehicle in real time;

a predicted movement state information determining unit 42 configured to determine first following vehicle predicted movement state information and lead vehicle predicted movement state information corresponding to a number of time points after a current time point based on the first following vehicle movement state information and the lead vehicle movement state information, respectively, and determine, when there is the adjacent second following vehicle in front of the first following vehicle itself, second following vehicle predicted movement state information corresponding to the number of time points after the current time point based on the second following vehicle movement state information;

an optimized control quantity determining unit 43 configured to determine, when there is no adjacent second following vehicle in front of the first following vehicle itself, optimized control quantities corresponding to respective ones of the number of time points based on the first following vehicle predicted movement state information and the lead vehicle predicted movement state information corresponding to the respective ones of the number of time points by means of optimized solution, or determine, when there is the adjacent second following vehicle in front of the first following vehicle itself, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution; and an optimized control quantity transmitting unit 44 configured to transmit the optimized control quantities to a longitudinal controller of the first following vehicle itself, such that the longitudinal controller controls a longitudinal actuator of the first following vehicle itself to perform longitudinal control in accordance with the optimized control quantities.

Figure 5:
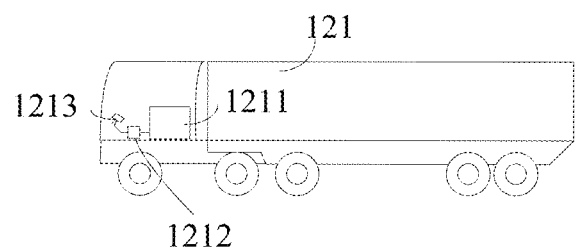
FIG. 5 is a schematic diagram showing a structure of an autonomous vehicle according to an embodiment of the present disclosure.

As shown in FIGS. 1 and 5, according to an embodiment of the present disclosure, an autonomous vehicle is provided. The autonomous vehicle operates in a platoon 10 as a first following vehicle 121 in the platoon 10. The platoon includes a lead vehicle 11 and one or more following vehicles 12. The one or more following vehicles 12 are arranged in a predefined order behind the lead vehicle 11.

The autonomous vehicle (i.e., the first following vehicle 121) includes a first vehicle mounted apparatus 1211, a longitudinal controller 1212, and a longitudinal actuator 1213. The first vehicle mounted apparatus 1211 is connected to the longitudinal controller 1212. The longitudinal controller 1212 is connected to the longitudinal actuator 1213.

The first vehicle mounted apparatus 1211 is configured to: obtain first following vehicle movement state information of a first following vehicle itself in the platoon and lead vehicle movement state information of the lead vehicle in real time, and obtain, when there is an adjacent second following vehicle in front of the first following vehicle itself, second following vehicle movement state information of the second following vehicle in real time; determine first following vehicle predicted movement state information and lead vehicle predicted movement state information corresponding to a number of time points after a current time point based on the first following vehicle movement state information and the lead vehicle movement state information, respectively, and determine, when there is the adjacent second following vehicle in front of the first following vehicle itself, second following vehicle predicted movement state information corresponding to the number of time points after the current time point based on the second following vehicle movement state information; determine, when there is no adjacent second following vehicle in front of the first following vehicle itself, optimized control quantities corresponding to respective ones of the number of time points based on the first following vehicle predicted movement state information and the lead vehicle predicted movement state information corresponding to the respective ones of the number of time points by means of optimized solution, or determine, when there is the adjacent second following vehicle in front of the first following vehicle itself, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution; and transmit the optimized control quantities to the longitudinal controller of the first following vehicle itself.

The longitudinal controller 1212 is configured to control the longitudinal actuator 1213 of the first following vehicle itself to perform longitudinal control in accordance with the optimized control quantities.

In addition, according to an embodiment of the present disclosure, a computer readable storage medium is provided. The computer readable storage medium has a computer program stored thereon. The program, when executed on a processor, cause the processor to perform the above vehicle control method for platooning corresponding to FIGS. 1-3. For details of its implementation, reference can be made to the method embodiments corresponding to FIGS. 1-3, and description thereof will be omitted here.

In addition, according to an embodiment of the present disclosure, a computer program product is provided. The computer program product includes instructions. The computer program product, when executed on a computer, causes the computer to perform the above vehicle control method for platooning corresponding to FIGS. 1-3. For details of its implementation, reference can be made to the method embodiments corresponding to FIGS. 1-3, and description thereof will be omitted here.

In addition, according to an embodiment of the present disclosure, a chip system is provided. The chip system includes a processor. The processor is coupled to a memory storing program instructions which, when executed by the processor, cause the processor to perform the above vehicle control method for platooning corresponding to FIGS. 1-3. For details of its implementation, reference can be made to the method embodiments corresponding to FIGS. 1-3, and description thereof will be omitted here.

In addition, according to an embodiment of the present disclosure, a circuit system is provided. The circuit system includes a processing circuit configured to perform the above vehicle control method for platooning corresponding to FIGS. 1-3. For details of its implementation, reference can be made to the method embodiments corresponding to FIGS. 1-3, and description thereof will be omitted here.

In addition, according to an embodiment of the present disclosure, a computer server is provided. The computer server includes a memory and one or more processors communicatively connected to the memory. The memory stores instructions executable by the one or more processors, the instructions, when executed by the one or more processors, causing the one or more processors to perform the above vehicle control method for platooning corresponding to FIGS. 1-3. For details of its implementation, reference can be made to the method embodiments corresponding to FIGS. 1-3, and description thereof will be omitted here.

The present disclosure provides a vehicle control method for platooning, a vehicle mounted apparatus, and a vehicle. First, first following vehicle movement state information and lead vehicle movement state information can be obtained in real time. When there is an adjacent second following vehicle in front of the first following vehicle, second following vehicle movement state information can be obtained in real time. Then, first following vehicle predicted movement state information and lead vehicle predicted movement state information corresponding to a number of time points in the future can be determined. When there is the adjacent second following vehicle in front of the first following vehicle, second following vehicle predicted movement state information corresponding to the number of time points in the future can be determined. Then, optimized control quantities corresponding to respective ones of the number of time points can be determined by means of optimized solution, and longitudinal control can be performed in accordance with the optimized control quantities. It can be seen that the present disclosure can comprehensively consider the relationship between the following vehicle and the lead vehicle, as well as the relationship between the following vehicle and its preceding vehicle, and then obtain the optimized control quantities for the following vehicle, such that vehicles in a platoon can be controlled smoothly and accurately, thereby avoiding platooning failures due to drastic changes in distances and/or speeds of the vehicles in the platoon.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage, CD-ROM, and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In the present disclosure, the principles and implementations of the present disclosure have been described with reference to specific embodiments. These embodiments are illustrative only, for facilitating understanding of the methods according to the present disclosure and core concepts thereof. Moreover, for those of ordinary skill in the art, modifications can be made to the specific implementations and application scenarios without departing from the principle of the present disclosure. In summary, the content of the specification should not be construed as limitation to the present disclosure.

What is claimed is:

1. A vehicle control method for platooning, applied in a platoon comprising a lead vehicle and one or more following vehicles, the one or more following vehicles being arranged in a predefined order behind the lead vehicle, the method comprising:

determining first following vehicle predicted movement state information and lead vehicle predicted movement state information corresponding to a number of time points after a current time point based on first following vehicle movement state information of a first following vehicle in the platoon, and lead vehicle movement state information of the lead vehicle, respectively, and determining, in response to there being an adjacent second following vehicle in front of the first following vehicle, second following vehicle predicted movement state information corresponding to the number of time points after the current time point based on second following vehicle movement state information of the second following vehicle;

determining, in response to there being the adjacent second following vehicle in front of the first following vehicle, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution, comprising:

determining an overall constraint model based on a distance constraint, a speed constraint, and an acceleration constraint between the first following vehicle and the lead vehicle, and a distance constraint, a speed constraint, and an acceleration constraint between the first following vehicle and the second following vehicle; and determining the optimized control quantities corresponding to the respective ones of the number of time points by determining an optimized solution based on the overall constraint model; and transmitting the optimized control quantities to a longitudinal controller of the first following vehicle, such that the longitudinal controller controls a longitudinal actuator of the first following vehicle to perform longitudinal control in accordance with the optimized control quantities.

2. The vehicle control method of claim 1, further comprising obtaining the first following vehicle movement state information of the first following vehicle in the platoon and the lead vehicle movement state information of the lead vehicle, comprising:

obtaining a first following vehicle speed, first following vehicle acceleration, and a first following vehicle position of the first following vehicle in the platoon, and obtaining a lead vehicle speed, lead vehicle acceleration, and a lead vehicle position, as transmitted by a lead vehicle mounted apparatus provided in the lead vehicle via a lead vehicle V2X communication device, via a first V2X communication device provided in the first following vehicle.

3. The vehicle control method of claim 2, further comprising obtaining, in response to there being the adjacent second following vehicle in front of the first following vehicle, the second following vehicle movement state information of the second following vehicle, comprising:

obtaining, in response to there being the adjacent second following vehicle in front of the first following vehicle, a second following vehicle speed, second following vehicle acceleration, and a second following vehicle position, as transmitted by a second vehicle mounted apparatus provided in the second following vehicle via a second vehicle V2X communication device, via the first V2X communication device provided in the first following vehicle.

4. The vehicle control method of claim 1, wherein the first following vehicle movement state information comprises: a first following vehicle speed, first following vehicle acceleration, and a first following vehicle position of the first following vehicle, and the lead vehicle movement state information comprises: a lead vehicle speed, lead vehicle acceleration, and a lead vehicle position, and said determining the first following vehicle predicted movement state information and the lead vehicle predicted movement state information corresponding to the number of time points after the current time point based on the first following vehicle movement state information and the lead vehicle movement state information, respectively, comprises:

determining first following vehicle predicted speeds and first following vehicle predicted positions corresponding to the respective ones of the number of time points after the current time point based on a first following vehicle speed, first following vehicle acceleration, and a first following vehicle position corresponding to the current time point; and determining lead vehicle predicted speeds and lead vehicle predicted positions corresponding to the respective ones of the number of time points after the current time point based on a lead vehicle speed, lead vehicle acceleration, and a lead vehicle position corresponding to the current time point.

5. The vehicle control method of claim 4, wherein said determining the first following vehicle predicted speeds and the first following vehicle predicted positions corresponding to the respective ones of the number of time points after the current time point based on the first following vehicle speed, the first following vehicle acceleration, and the first following vehicle position corresponding to the current time point comprises:

determining the first following vehicle predicted speed $V_{n(k)}$ and the first following vehicle predicted position $P_{n(k)}$ corresponding to the k-th time point $t_{(k)}$ based on the first following vehicle speed $V_{n(0)}$, the first following vehicle acceleration $A_{n(0)}$, and the first following vehicle position $P_{n(0)}$ corresponding to the current time point $t_{(0)}$ according to:

$$V_{n(k)} = V_{n(k-1)} + A_{n(k-1)} \cdot (t_{(k)} - t_{(k-1)}), \text{ and}$$

$$P_{n(k)} = P_{n(k-1)} + V_{n(k-1)} \cdot (t_{(k)} - t_{(k-1)}) + \frac{1}{2} A_{n(k-1)} \cdot (t_{(k)} - t_{(k-1)})^2,$$

wherein n represents the n-th following vehicle in the platoon, $V_{n(k-1)}$ is the first following vehicle predicted speed at the (k−1)-th time point $t_{(k-1)}$, $A_{n(k-1)}$ is the first following vehicle acceleration at the (k−1)-th time point $t_{(k-1)}$, and $P_{n(k-1)}$ is the first following vehicle predicted position at the (k−1)-th time point $t_{(k-1)}$, and said determining the lead vehicle predicted speeds and the lead vehicle predicted positions corresponding to the respective ones of the number of time points after the current time point based on the lead vehicle speed, the lead vehicle acceleration, and the lead vehicle position corresponding to the current time point comprises:

determining the lead vehicle predicted speed $V_{0(k)}$ and the lead vehicle predicted position $P_{0(k)}$ corresponding to the k-th time point $t_{(k)}$ based on the lead vehicle speed $V_{0(0)}$, the lead vehicle acceleration $A_{0(0)}$, and the lead vehicle position $P_{0(0)}$ corresponding to the current time point $t_{(0)}$ according to:

$$V_{0(k)} = V_{0(k-1)} + A_{0(k-1)} \cdot (t_{(k)} - t_{(k-1)}), \text{ and}$$

$$P_{0(k)} = P_{0(k-1)} + V_{0(k-1)} \cdot (t_{(k)} - t_{(k-1)}) + \frac{1}{2} A_{0(k-1)} \cdot (t_{(k)} - t_{(k-1)})^2,$$

wherein $V_{0(k-1)}$ is the lead vehicle predicted speed at the (k−1)-th time point $t_{(k)}$, $A_{0(k-1)}$ is the lead vehicle acceleration at the (k−1)-th time point $t_{(k-1)}$, and $P_{0(k-1)}$ is the lead vehicle predicted position at the (k−1)-th time point $t_{(k-1)}$.

6. The vehicle control method of claim 5, wherein the second following vehicle movement state information comprises: a second following vehicle speed, second following vehicle acceleration, and a second following vehicle position of the second following vehicle, and said determining, in response to there being the adjacent second following vehicle in front of the first following vehicle, the second following vehicle predicted movement state information corresponding to the number of time points after the current time point based on the second following vehicle movement state information comprises:

determining, in response to there being the adjacent second following vehicle in front of the first following vehicle, second following vehicle predicted speeds and second following vehicle predicted positions corresponding to the respective ones of the number of time points after the current time point based on a second following vehicle speed, second following vehicle acceleration, and a second following vehicle position corresponding to the current time point.

7. The vehicle control method of claim 6, wherein said determining, in response to there being the adjacent second following vehicle in front of the first following vehicle, the second following vehicle predicted speeds and the second following vehicle predicted positions corresponding to the respective ones of the number of time points after the current time point based on the second following vehicle speed, the second following vehicle acceleration, and the second following vehicle position corresponding to the current time point comprises:

determining the second following vehicle predicted speed $V_{(n-1)(k)}$ and the second following vehicle predicted position $P_{(n-1)(k)}$ corresponding to the k-th time point $t_{(k)}$ based on the second following vehicle speed $V_{(n-1)(0)}$, the second following vehicle acceleration $A_{(n-1)(0)}$, and the second following vehicle position $P_{(n-1)(0)}$ corresponding to the current time point $t_{(0)}$ according to:

$$V_{(n-1)(k)} = V_{(n-1)(k-1)} + A_{(n-1)(k-1)} \cdot (t_{(k)} - t_{(k-1)}), \text{ and}$$

$$P_{(n-1)(k)} = P_{(n-1)(k-1)} + V_{(n-1)(k-1)} \cdot (t_{(k)} - t_{(k-1)}) + \frac{1}{2} A_{(n-1)(k-1)} \cdot (t_{(k)} - t_{(k-1)})^2,$$

wherein n−1 represents the (n−1)-th following vehicle in the platoon, $V_{(n-1)(k-1)}$ is the second following vehicle predicted speed at the (k−1)-th time point $t_{(k-1)}$, $A_{(n-1)(k-1)}$ is the second following vehicle acceleration at the (k−1)-th time point $t_{(k-1)}$, and $P_{(n-1)(k-1)}$ is the second following vehicle predicted position at the (k−1)-th time point $t_{(k-1)}$.

8. The vehicle control method of claim 7, further comprising determining, in response to there being no adjacent second following vehicle in front of the first following vehicle, the optimized control quantities corresponding to respective ones of the number of time points based on the first following vehicle predicted movement state information and the lead vehicle predicted movement state information corresponding to the respective ones of the number of time points by means of optimized solution, comprising:

determining, in response to there being no adjacent second following vehicle in front of the first following vehicle, a distance constraint, a speed constraint, and an acceleration constraint between the first following vehicle and the lead vehicle based on the first following vehicle predicted speeds, the first following vehicle predicted positions, the lead vehicle predicted speeds, and the lead vehicle predicted positions corresponding to the respective ones of the number of time points;

determining an overall constraint model based on the distance constraint, the speed constraint, and the acceleration constraint between the first following vehicle and the lead vehicle; and determining the optimized control quantities corresponding to the respective ones of the number of time points by determining an optimized solution based on the overall constraint model.

9. The vehicle control method of claim 8, wherein the distance constraint, the speed constraint, and the acceleration constraint between the first following vehicle and the lead vehicle are respectively:

$$DD_{(0)} = \text{abs}(P_{1(k)} - P_{0(k)} - \text{dis}),$$

$$DV_{(0)} = \text{abs}(V_{1(k)} - V_{0(k)}), \text{ and}$$

$$DA_{(0)} = \text{abs}(A_{1(k)} - A_{0(k)}),$$

where $DD_{(0)}$ is the distance constraint between the first following vehicle and the lead vehicle, $DV_{(0)}$ is the speed constraint between the first following vehicle and the lead vehicle, $DA_{(0)}$ is the acceleration constraint between the first following vehicle and the lead vehicle, abs represents an absolute value function, dis represents a predefined target tracking distance, $P_{1(k)}$ is the first following vehicle predicted position at the k-th time point $t_{(k)}$, $P_{0(k)}$ is the lead vehicle predicted position at the k-th time point $t_{(k)}$, $V_{1(k)}$ is the first following vehicle predicted speed at the k-th time point $t_{(k)}$, $V_{0(k)}$ is the lead vehicle predicted speed at the k-th time point $t_{(k)}$, $A_{1(k)}$ is the first following vehicle acceleration at the k-th time point $t_{(k)}$, and $A_{0(k)}$ is the lead vehicle acceleration at the k-th time point $t_{(k)}$, the overall constraint model is:

$$D_1 = a_1 DD_{(0)} + a_2 DV_{(0)} + a_3 DA_{(0)},$$

where $a_1$, $a_2$, and $a_3$ are predefined weight coefficients, and said determining the optimized control quantities corresponding to the respective ones of the number of time points by determining the optimized solution based on the overall constraint model comprises:

determining the optimized solution based on the overall constraint model of $D_1 = a_1 DD_{(0)} + a_2 DV_{(0)} + a_3 DA_{(0)}$, to determine, as the optimized control quantity, the first following vehicle acceleration $A_{1(k)}$ at the k-th time point $t_{(k)}$ when $D_1$ is minimized.

10. The vehicle control method of claim 7, determining, in response to there being the adjacent second following vehicle in front of the first following vehicle, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution further comprises:

determining the distance constraint, the speed constraint, and the acceleration constraint between the first following vehicle and the lead vehicle based on the first following vehicle predicted speeds, the first following vehicle predicted positions, the lead vehicle predicted speeds, and the lead vehicle predicted positions corresponding to the respective ones of the number of time points; and determining the distance constraint, the speed constraint, and the acceleration constraint between the first following vehicle and the second following vehicle based on the first following vehicle predicted speeds, the first following vehicle predicted positions, the second following vehicle predicted speeds, and the second following vehicle predicted positions corresponding to the respective ones of the number of time points.

11. The vehicle control method of claim 10, wherein the distance constraint, the speed constraint, and the acceleration constraint between the first following vehicle and the lead vehicle are respectively:

$$DD_{(0)} = \sum_{1}^{n} \text{abs}(P_{n(k)} - P_{0(k)} - n \cdot dis),$$

$$DV_{(0)} = \sum_{1}^{n} \text{abs}(V_{n(k)} - V_{0(k)}), \text{ and}$$

$$DA_{(0)} = \sum_{1}^{n} \text{abs}(A_{n(k)} - A_{0(k)}),$$

wherein $DD_{(0)}$ is the distance constraint between the first following vehicle and the lead vehicle, $DV_{(0)}$ is the speed constraint between the first following vehicle and the lead vehicle, $DA_{(0)}$ is the acceleration constraint between the first following vehicle and the lead vehicle, abs represents an absolute value function, dis represents a predefined target tracking distance, $P_{n(k)}$ is the first following vehicle predicted position at the k-th time point $t_{(k)}$, $P_{0(k)}$ is the lead vehicle predicted position at the k-th time point $t_{(k)}$; $V_{n(k)}$ is the first following vehicle predicted speed at the k-th time point $t_{(k)}$, $V_{0(k)}$ is the lead vehicle predicted speed at the k-th time point $t_{(k)}$, $A_{n(k)}$ is the first following vehicle acceleration at the k-th time point $t_{(k)}$, $A_{0(k)}$ is the lead vehicle acceleration at the k-th time point $t_{(k)}$, and n indicates that the first following vehicle is the n-th following vehicle in the platoon, the distance constraint, the speed constraint, and the acceleration constraint between the first following vehicle and the second following vehicle are respectively:

$$DD_{(n-1)} = \sum_{2}^{n} \text{abs}(P_{n(k)} - P_{(n-1)(k)} - dis),$$

$$DV_{(n-1)} = \sum_{2}^{n} \text{abs}(V_{n(k)} - V_{(n-1)(k)}), \text{ and}$$

$$DA_{(n-1)} = \sum_{2}^{n} \text{abs}(A_{n(k)} - A_{(n-1)(k)}),$$

wherein $DD_{(n-1)}$ is the distance constraint between the first following vehicle and the second following vehicle, $DV_{(n-1)}$ is the speed constraint between the first following vehicle and the second following vehicle, $DA_{(n-1)}$ is the acceleration constraint between the first following vehicle and the second following vehicle, $P_{(n-1)(k)}$ is the second following vehicle predicted position at the k-th time point $t_{(k)}$, $V_{(n-1)(k)}$ is the second following vehicle predicted speed at the k-th time point $t_{(k)}$, $A_{(n-1)(k)}$ is the second following vehicle acceleration at the k-th time point $t_{(k)}$, n indicates that the first following vehicle is the n-th following vehicle in the platoon, and n−1 indicates that the second following vehicle is the (n−1)-th following vehicle in the platoon, the overall constraint model is:

$$D_2 = b_1 DD_{(n-1)} + b_2 DD_{(0)} + b_3 DV_{(n-1)} + b_4 DV_{(0)} + b_5 DA_{(n-1)} + b_6 DA_{(0)}$$

where $b_1$, $b_2$, $b_3$, $b_4$, $b_5$, and $b_6$ are predefined weight coefficients, and said determining the optimized control quantities corresponding to the respective ones of the number of time points by determining an optimized solution based on the overall constraint model comprises:

determining the optimized solution based on the overall constraint model of $D_2 = b_1 DD_{(n-1)} + b_2 DD_{(0)} + b_3 DV_{(n-1)} + b_4 DV_{n(0)} + b_5 DA_{(n-1)} + b_6 DA_{(0)}$, to determine, as the optimized control quantity, the first following vehicle acceleration $A_{n(k)}$ at the k-th time point $t_{(k)}$ when $D_2$ is minimized.

12. A first vehicle mounted apparatus, provided in a first following vehicle in a platoon comprising a lead vehicle and one or more following vehicles, the one or more following vehicles being arranged in a predefined order behind the lead vehicle, the first vehicle mounted apparatus comprising:

a predicted movement state information determining unit configured to determine first following vehicle predicted movement state information and lead vehicle predicted movement state information corresponding to a number of time points after a current time point based on the first following vehicle movement state information of the first following vehicle in the platoon, and lead vehicle movement state information of the lead vehicle, respectively, and determine, in response to there being an adjacent second following vehicle in front of the first following vehicle, second following vehicle predicted movement state information corresponding to the number of time points after the current time point based on the second following vehicle movement state information of the second following vehicle;

an optimized control quantity determining unit configured to determine, in response to there being the adjacent second following vehicle in front of the first following vehicle, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution, wherein the optimized control quantity determining unit further configured to:

determine an overall constraint model based on a distance constraint, a speed constraint, and an acceleration constraint between the first following vehicle and the lead vehicle, and a distance constraint, a speed constraint, and an acceleration constraint between the first following vehicle and the second following vehicle; and determine the optimized control quantities corresponding to the respective ones of the number of time points by determining an optimized solution based on the overall constraint model; and an optimized control quantity transmitting unit configured to transmit the optimized control quantities to a longitudinal controller of the first following vehicle, such that the longitudinal controller controls a longitudinal actuator of the first following vehicle to perform longitudinal control in accordance with the optimized control quantities.

13. An autonomous vehicle, operating in a platoon as a first following vehicle in the platoon, the platoon comprising a lead vehicle and one or more following vehicles, the one or more following vehicles being arranged in a predefined order behind the lead vehicle, wherein the autonomous vehicle comprises a first vehicle mounted apparatus, a longitudinal controller, and a longitudinal actuator, the first vehicle mounted apparatus being connected to the longitudinal controller, and the longitudinal controller being connected to the longitudinal actuator, the first vehicle mounted apparatus is configured to:
determine first following vehicle predicted movement state information and lead vehicle predicted movement state information corresponding to a number of time points after a current time point based on first following vehicle movement state information of the first following vehicle in the platoon, and lead vehicle movement state information of the lead vehicle, respectively, and determine, in response to there being an adjacent second following vehicle in front of the first following vehicle, second following vehicle predicted movement state information corresponding to the number of time points after the current time point based on second following vehicle movement state information of the second following vehicle;

determine, in response to there being the adjacent second following vehicle in front of the first following vehicle, the optimized control quantities corresponding to the respective ones of the number of time points based on the first following vehicle predicted movement state information, the second following vehicle predicted movement state information, and the lead vehicle predicted movement state information corresponding to the respective ones of the number of time points by means of optimized solution;

determine an overall constraint model based on a distance constraint, a speed constraint, and an acceleration constraint between the first following vehicle and the lead vehicle, and a distance constraint, a speed constraint, and an acceleration constraint between the first following vehicle and the second following vehicle; and determine the optimized control quantities corresponding to the respective ones of the number of time points by determining an optimized solution based on the overall constraint model; and transmit the optimized control quantities to the longitudinal controller of the first following vehicle, and the longitudinal controller is configured to control the longitudinal actuator of the first following vehicle to perform longitudinal control in accordance with the optimized control quantities.

14. The autonomous vehicle of claim 13, wherein the first vehicle mounted apparatus is further configured to obtain the first following vehicle movement state information of the first following vehicle in the platoon and the lead vehicle movement state information of the lead vehicle by:

obtaining a first following vehicle speed, first following vehicle acceleration, and a first following vehicle position of the first following vehicle in the platoon, and obtaining a lead vehicle speed, lead vehicle acceleration, and a lead vehicle position, as transmitted by a lead vehicle mounted apparatus provided in the lead vehicle via a lead vehicle V2X communication device, via a first V2X communication device provided in the first following vehicle.

15. The autonomous vehicle of claim 14, wherein the first vehicle mounted apparatus is further configured to obtain, in response to there being the adjacent second following vehicle in front of the first following vehicle, the second following vehicle movement state information of the second following vehicle by:

obtaining, in response to there being the adjacent second following vehicle in front of the first following vehicle, a second following vehicle speed, second following vehicle acceleration, and a second following vehicle position, as transmitted by a second vehicle mounted apparatus provided in the second following vehicle via a second vehicle V2X communication device, via the first V2X communication device provided in the first following vehicle.

16. The autonomous vehicle of claim 13, wherein the first following vehicle movement state information comprises: a first following vehicle speed, first following vehicle acceleration, and a first following vehicle position of the first following vehicle, and the lead vehicle movement state information comprises: a lead vehicle speed, lead vehicle acceleration, and a lead vehicle position, and wherein the first vehicle mounted apparatus is configured to determine the first following vehicle predicted movement state information and the lead vehicle predicted movement state information corresponding to the number of time points after the current time point based on the first following vehicle movement state information and the lead vehicle movement state information, respectively, by:

determining first following vehicle predicted speeds and first following vehicle predicted positions corresponding to the respective ones of the number of time points after the current time point based on a first following vehicle speed, first following vehicle acceleration, and a first following vehicle position corresponding to the current time point; and determining lead vehicle predicted speeds and lead vehicle predicted positions corresponding to the respective ones of the number of time points after the current time point based on a lead vehicle speed, lead vehicle acceleration, and a lead vehicle position corresponding to the current time point.

17. The autonomous vehicle of claim 13, wherein the second following vehicle movement state information comprises: a second following vehicle speed, second following vehicle acceleration, and a second following vehicle position of the second following vehicle, and wherein the first vehicle mounted apparatus is configured to determine, in response to there being the adjacent second following vehicle in front of the first following vehicle, the second following vehicle predicted movement state information corresponding to the number of time points after the current time point based on the second following vehicle movement state information by:

determining, in response to there being the adjacent second following vehicle in front of the first following vehicle, second following vehicle predicted speeds and second following vehicle predicted positions corresponding to the respective ones of the number of time points after the current time point based on a second following vehicle speed, second following vehicle acceleration, and a second following vehicle position corresponding to the current time point.

18. The autonomous vehicle of claim 13, wherein the first vehicle mounted apparatus is configured to determine, in response to there being no adjacent second following vehicle in front of the first following vehicle, optimized control quantities corresponding to respective ones of the number of time points based on the first following vehicle predicted movement state information and the lead vehicle predicted movement state information corresponding to the respective ones of the number of time points by means of optimized solution by:
- determining, in response to there being no adjacent second following vehicle in front of the first following vehicle, a distance constraint, a speed constraint, and an acceleration constraint between the first following vehicle and the lead vehicle based on the first following vehicle predicted speeds, the first following vehicle predicted positions, the lead vehicle predicted speeds, and the lead vehicle predicted positions corresponding to the respective ones of the number of time points;
- determining an overall constraint model based on the distance constraint, the speed constraint, and the acceleration constraint between the first following vehicle and the lead vehicle; and
- determining the optimized control quantities corresponding to the respective ones of the number of time points by determining an optimized solution based on the overall constraint model.

19. A non-transitory computer readable storage medium, comprising a program or instructions which, when executed on a computer, cause the computer to perform the vehicle control method for platooning according to claim 1.

20. A computing device, comprising a memory and one or more processors communicatively connected to the memory, wherein
the memory stores instructions executable by the one or more processors, the instructions, when executed by the one or more processors, causing the one or more processors to perform the vehicle control method for platooning according to claim 1.

* * * * *

UNITED STATES PATENT AND TRADEMARK OFFICE
CERTIFICATE OF CORRECTION

| | |
|---|---|
| PATENT NO. | : 11,676,493 B2 |
| APPLICATION NO. | : 17/133634 |
| DATED | : June 13, 2023 |
| INVENTOR(S) | : Yong Xu |

It is certified that error appears in the above-identified patent and that said Letters Patent is hereby corrected as shown below:

In the Specification

In Column 11, Line 60, delete "as" and insert -- a2 --, therefor.

In the Claims

In Column 20, Line 55, in Claim 5, delete "t(k)," and insert -- t(k-1), --, therefor.

In Column 22, Line 44, in Claim 10, delete "claim 7," and insert -- claim 7, wherein said --, therefor.

Signed and Sealed this
Eighth Day of August, 2023

Katherine Kelly Vidal
*Director of the United States Patent and Trademark Office*